US007657278B2

(12) United States Patent
Koo et al.

(10) Patent No.: US 7,657,278 B2
(45) Date of Patent: Feb. 2, 2010

(54) METHOD AND APPARATUS FOR DERIVING A COMBINED TRANSMIT POWER CONTROL COMMAND DURING HANDOVER

(75) Inventors: Chang-Soo Koo, Melville, NY (US); Donald M. Grieco, Manhassett, NY (US); Jaeyoung Kwak, Morganville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 874 days.

(21) Appl. No.: 11/234,629

(22) Filed: Sep. 23, 2005

(65) Prior Publication Data

US 2007/0026885 A1 Feb. 1, 2007

Related U.S. Application Data

(60) Provisional application No. 60/702,863, filed on Jul. 27, 2005.

(51) Int. Cl.
*H04W 52/24* (2006.01)
*H04W 52/40* (2009.01)

(52) U.S. Cl. .......................... 455/522; 455/442; 455/69

(58) Field of Classification Search ....................... None
See application file for complete search history.

(56) References Cited

U.S. PATENT DOCUMENTS 6,269,239 B1 * 7/2001 Hashem et al. ............... 455/69
6,490,461 B1 * 12/2002 Muller ....................... 455/522
2008/0102878 A1 * 5/2008 Tiedemann, Jr. ............ 455/522
2008/0214224 A1 * 9/2008 Ostman et al. .............. 455/522

OTHER PUBLICATIONS

"3rd Generation Partnership Project; Technical Specification Group Radio Access Network; Physical Layer Procedures (FDD)", Release 4, 3GPP TS 25.214 V4.6.0, Mar. 2003.

"3rd Generation Partnership Project; Technical Specification Group Radio Access Networks; User Equipment (UE) Radio Transmission and Reception (FDD)", Release 4, 3GPP TS 25.101 V4.11.0, Mar. 2004.

* cited by examiner

*Primary Examiner*—Philip J Sobutka
(74) *Attorney, Agent, or Firm*—Volpe and Koenig, P.C.

(57) ABSTRACT

A method and apparatus for deriving a combined transmit power control (TPC) command during handover are disclosed. During handover, a combined TPC command is generated from two or more TPC commands. The combined TPC command is set to −1 for decrease of the transmit power if a soft symbol of the TPC signal from any cell indicates decrease of the transmit power and the signal-to-interference ratio for the cell is greater than a reliability threshold. Otherwise, the combined TPC command is set to −1 if the function $\gamma$ is not greater than the combining threshold, and set to +1 if the function $\gamma$ is greater than the combining threshold, where the function $\gamma$ represents a log-likelihood ratio of a probability density function of the combined TPC command.

24 Claims, 3 Drawing Sheets

METHOD AND APPARATUS FOR DERIVING A COMBINED TRANSMIT POWER CONTROL COMMAND DURING HANDOVER

CROSS REFERENCE TO RELATED APPLICATION

This application claims the benefit of U.S. provisional application No. 60/702,863 filed Jul. 27, 2005, which is incorporated by reference as if fully set forth.

FIELD OF INVENTION

The present invention is related to wireless communication systems. More particularly, the present invention is related to a method and apparatus for deriving a combined transmit power control (TPC) command during handover.

BACKGROUND

In a multi-cell wireless communication system, a wireless transmit/receive unit (WTRU) receives TPC commands from more than one cell during handover. In one scheme, set forth under Third Generation Partnership Project (3GPP) standards, the WTRU conducts a reliability decision on each of the power control commands $TPC_i$, where i=1, 2, . . . , N, (where N is greater than 1 and is the number of TPC commands from radio links of different radio link sets), and derives a combined TPC command as a function of all N soft symbol decisions $W_i$:

$$\text{Combined\_}TPC\text{\_cmd}=\gamma(W_1, W_2, \ldots W_N);$$

where Combined_TPC_cmd can take the values 1 (increase power) or −1 (decrease power). The function γ must fulfill the criteria as specified in the standards.

The 3GPP standards also require that if the N $TPC_i$ commands are random and uncorrelated, with equal probability of being transmitted as “0” or “1”, the probability that the output of γ is equal to 1 shall be greater than or equal to $1/(2^N)$; and the probability that the output of γ is equal to −1 shall be greater than or equal to 0.5. The output of γ shall equal 1 if the TPC commands from all the radio link sets are reliably “1”, and the output of γ shall equal −1 if a TPC command from any of the radio link sets is reliably “0”.

SUMMARY

The present invention is related to a method and apparatus for deriving a combined TPC command during handover. During handover, transmit power is controlled by TPC commands sent by two or more cells. After receiving multiple TPC commands, a combined TPC command is generated using two tests: 1) a test for the reliability of each radio link in the different radio link sets; and 2) a test for deciding the combined TPC command. The reliability test is based on soft symbols of the TPC signal of each radio link. The test regarding the decision for the combined TPC command is based on the function γ, which represents a log-likelihood ratio of a probability density function of the combined TPC command. Namely, the combined TPC command is set for decrease of the transmit power if a soft symbol of the TPC signal from any radio link indicates decrease of the transmit power and signal-to-interference ratio (SIR) for the radio link is greater than the reliability threshold. Otherwise, the combined TPC command is set for decrease of the transmit power if γ is not greater than the combining threshold, and is set for increase of the transmit power if γ is greater than the combining threshold.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Hereafter, the terminology “WTRU” includes but is not limited to a user equipment, a mobile station, a fixed or mobile subscriber unit, a pager, or any other type of device capable of operating in a wireless environment. When referred to hereafter, the terminology “base station” includes but is not limited to a Node-B, a site controller, an access point or any other type of interfacing device in a wireless environment.

The present invention is applicable to any type of wireless communication system. Hereafter, the present invention will be explained with reference to universal mobile telecommunication services (UMTS) frequency division duplex (FDD) systems. However, it should be noted that a UMTS FDD system is referred to as an example and the present invention is applicable to any type of wireless communication system.

The features of the present invention may be incorporated into an integrated circuit (IC) or be configured in a circuit comprising a multitude of interconnecting components.

Figure 1:
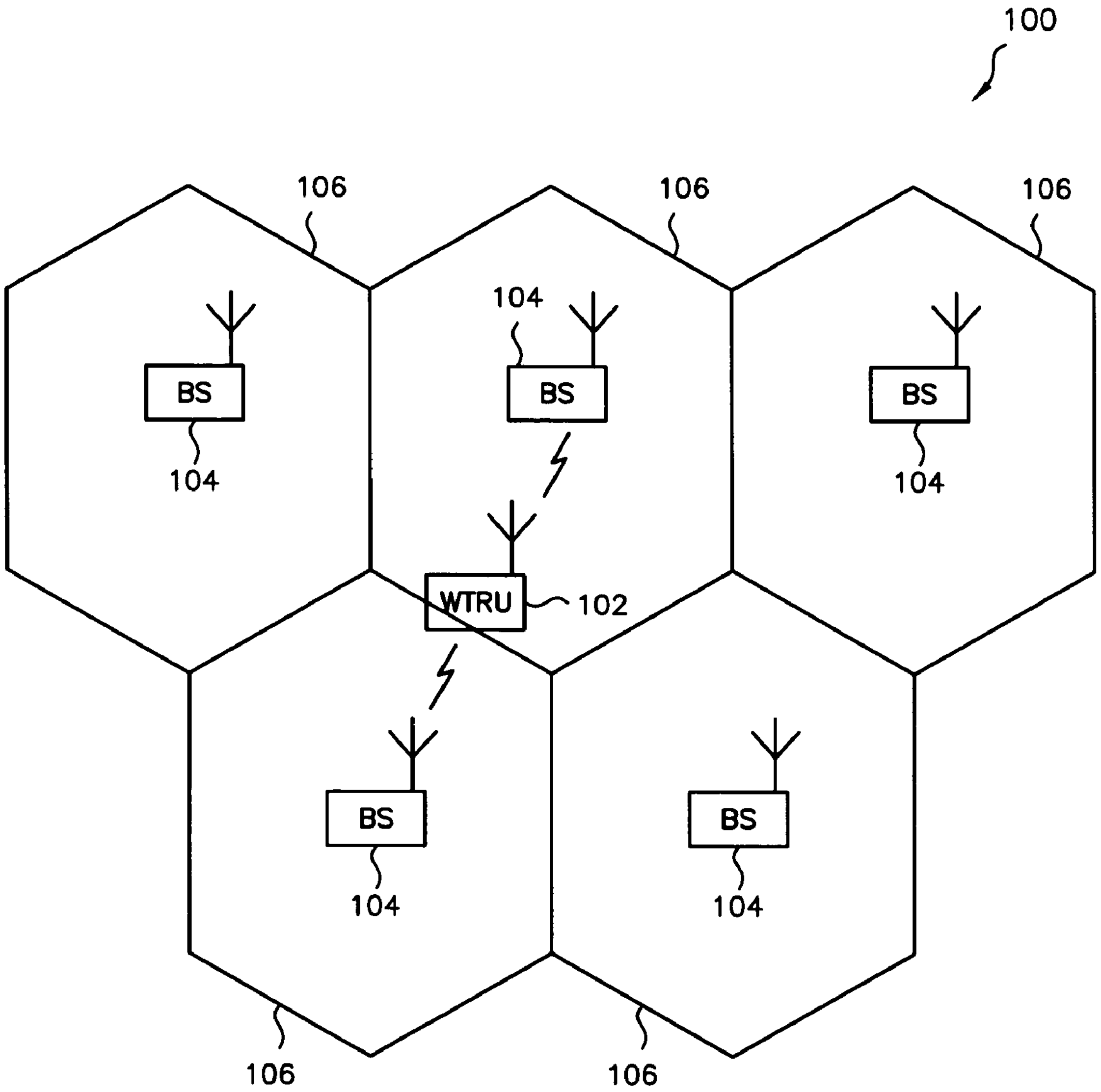
FIG. 1 is a diagram of a wireless communication system in which the present invention is implemented.

FIG. 1 is a diagram of a wireless communication system 100 in which the present invention is implemented. The system 100 comprises a plurality of cells 106, each of which is served by a base station 104. A WTRU 102 communicates with a base station 104 in one of the cells while performing TPC in accordance with a TPC command from the base station 104. When the WTRU 102 moves from one cell to another, a handover occurs. During soft handover, more than one radio link is established simultaneously with two or more cells 106. The WTRU 102 receives a TPC command from each base station 104 in the two or more cells 106 and must perform power correction to ensure that an adequate communication link, as experienced by the end user, is maintained.

The present invention is a method and apparatus for combining TPC commands from multiple cells 106 while the WTRU 102 is in soft handover. A combined TPC command, (Combined_TPC_cmd), which is derived as a function of all soft symbol decisions $W_i$ can be written as follows:

$$\text{Combined\_}TPC\text{\_cmd}=\gamma(W_1, W_2, \ldots W_N);$$

where Combined_TPC_cmd can take the values 1 (increase power) or −1 (decrease power). The soft symbols can be obtained with, for example, a Rake receiver.

Assuming $W_i$, a soft symbol decision, is a binary modulation with additive white Gaussian noise (AWGN) channels, the two conditional probability density functions (PDFs) of $W_i$ are defined as follows:

$$P(W_i|TPCCmnd=1)=\frac{1}{\sqrt{\pi N_0}}e^{-(W_i-\sqrt{E_i})^2/N_0}\text{; and} \qquad \text{Equation (1)}$$

$$P(W_i|TPCCmnd=-1)=\frac{1}{\sqrt{\pi N_0}}e^{-(W_i+\sqrt{E_i})^2/N_0}; \qquad \text{Equation (2)}$$

where $N_0$ is the white noise power spectral density and $E_i$, i=1,2, . . . , N, is the signal energy of the TPC command for each radio link.

If all N radio links of different radio link sets are sending TPC command=1, then the probability of (TPC command=1) for all $W_i$ is the lower bound ($>1/(2^N)$);

$$P(TPC\text{Cmnd}=1)=P(W_1|TPC\text{Cmnd}=1)*P(W_2|TPC\text{Cmnd}=1)*\ldots P(W_N|TPC\text{Cmnd}=1). \qquad \text{Equation (3)}$$

If any of radio links is sending TPC command =−1, the lower bound (>0.5) of the probability of (TPC command =−1) for all $W_i$ is obtained as follows:

$$P(TPC\text{Cmnd}=-1)=P(W_2|TPC\text{Cmnd}=-1)*P(W_2|TPC\text{Cmnd}=-1)*\ldots P(W_N|TPC\text{Cmnd}=-1). \qquad \text{Equation (4)}$$

In order to simplify the algorithm, the natural log function is applied to the ratio of two probabilities of Equation (3) and Equation (4) as follows:

$$\gamma=\ln\left[\frac{P(TPCCmnd=1)}{P(TPCCmnd=-1)}\right]=\frac{4}{N_0}\sum_{i=1}^{N}\sqrt{E_i}\,W_i; \qquad \text{Equation (5)}$$

where $N_0=2\sigma_n^2$, and $\sigma_n^2$ is a variance of a white noise.

The SIR of the TPC command for each radio link, SIR_TPC_Cell_i, can be defined as follows:

$$\text{SIR\_TPC\_Cell\_i}=\frac{2E_i}{N_0}=\frac{E_i}{\sigma_n^2}. \qquad \text{Equation (6)}$$

By substituting Equation (6) into Equation (5), Equation (7) is obtained as follows:

$$\gamma=(2/\sigma_n^2)\sum_{i=1}^{N}\sqrt{E_i}\,W_i=(2/\sigma_n)\sum_{i=1}^{N}\sqrt{\text{SIR\_TPC\_Cell\_i}}\,W_i. \qquad \text{Equation (7)}$$

The signal energy of the TPC command, $E_i$, and the SIR of the TPC command, SIR_TPC_Cell_i, can be derived from the power level, (P_Cell_i), and the SIR value, (SIR_Cell_i), for each radio link. For example, P_Cell_i and SIR_Cell_i, may be estimated from the pilot bits of a Dedicated Physical Control Channel (DPCCH).

Since P_Cell_i and SIR_Cell_i are measured from DPCCH pilot bits, those values should be adjusted to be used in combining the TPC commands according to the power offsets of DPCCH fields relative to the Dedicated Physical Data Channel (DPDCH) fields. Two offsets, a power offset and a magnitude offset, are defined as follows:

$$Pow\_\text{Offset}=10^{(PO2-PO3)/10}\text{; and} \qquad \text{Equation (8)}$$

$$Mag\_\text{Offset}=10^{(PO2-PO3)/20}; \qquad \text{Equation (9)}$$

where PO3 and PO2 are the power offsets of DPCCH pilot field and TPC field relative to the DPDCH power, respectively. Those power offsets are given by higher layer signaling. Therefore, $E_i$ and SIR_TPC_Cell_i of each radio link for combining of TPC commands are obtained as follows:

$$SIR\_TPC\_\text{Cell}\_i=SIR\_\text{Cell}\_i\times Pow\_\text{Offset}\text{; and} \qquad \text{Equation (10)}$$

$$\sqrt{Ei}=P\_Mag\_\text{Cell}\_i\times Mag\_\text{Offset}. \qquad \text{Equation (11)}$$

One way to estimate $\sigma_n^2$ is by averaging the noise power of each cell, $\sigma^2$_Cell_i, estimated from the DPCCH pilot of each radio link. Using those parameters, γ can be obtained as follows:

$$\gamma=(2N)\left(\sum_{i=1}^{N}\sqrt{E_i}\,W_i\right)\Bigg/\left[\sum_{i=1}^{N}\sigma^2\text{\_Cell\_i}\right]=\frac{2N\sum_{i=1}^{N}\text{P\_Mag\_Cell\_i}\times\text{Mag\_Offset}\times W_i}{\sum_{i=1}^{N}\sigma^2\text{\_Cell\_i}}. \qquad \text{Equation (12)}$$

Figure 2:
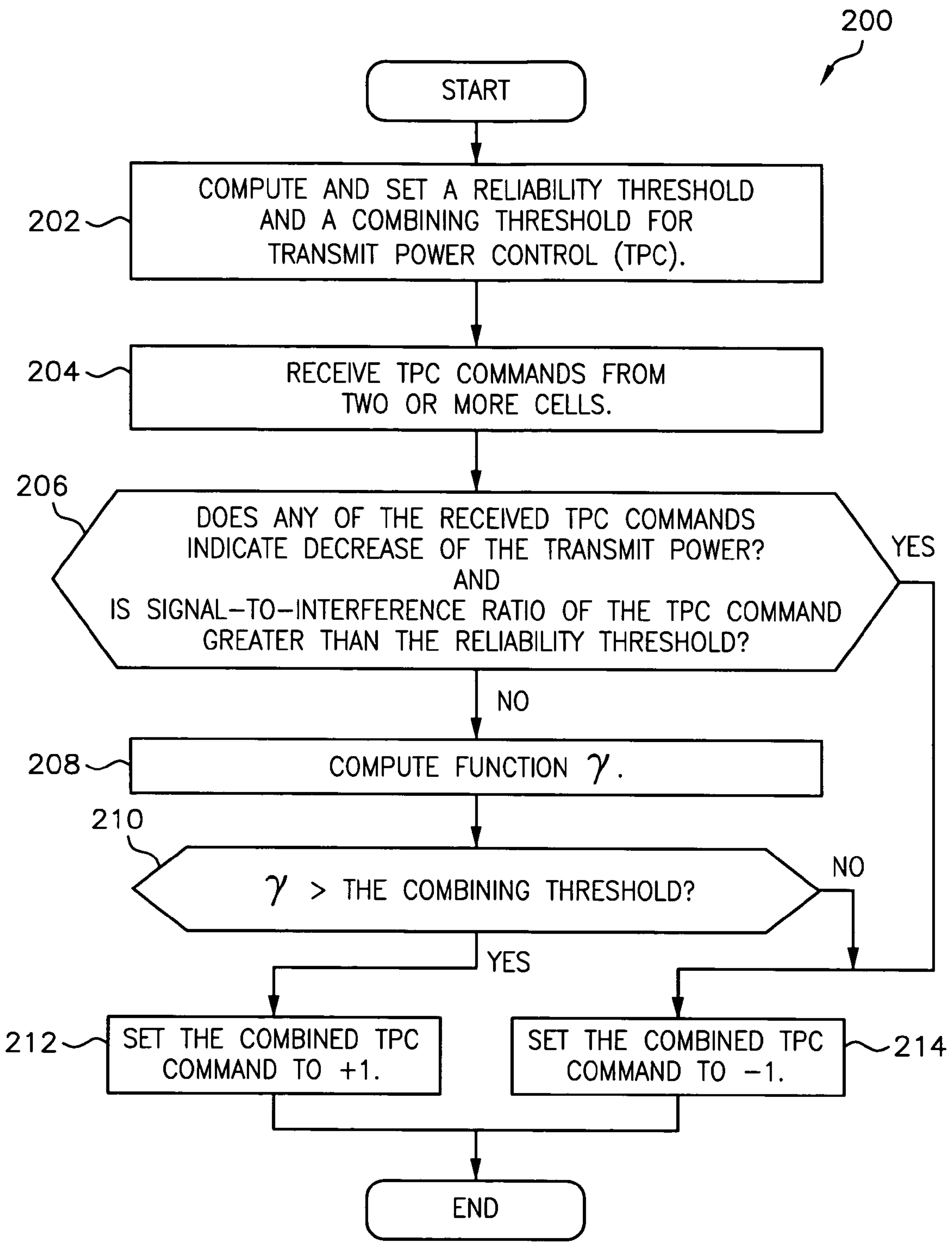
FIG. 2 is a flow diagram of a process for deriving a combined TPC command in accordance with the present invention.

FIG. 2 is a flow diagram of a process 200 for deriving a combined TPC command in accordance with the present invention. As described hereinbefore, two threshold tests are performed. One is a reliability test and the other is a log-likelihood test to decide the TPC command under the reliable connection.

A first threshold, (the reliability threshold), and a second threshold, (the combining threshold), are computed and/or set, appropriately (step 202). For example, the reliability threshold may be set to −2 dB as default with combining 2 bits of the TPC commands. The combining threshold is preferably computed from the minimum probabilities of both TPC commands as follows:

$$\text{Threshold\_2}=\ln\left[\frac{0.5}{(1/2^N)}\right]=(N-1)\ln 2. \qquad \text{Equation (13)}$$

A WTRU receives TPC commands from two or more cells (step 204). The WTRU then determines if the soft symbol from any of the received TPC commands indicates a decrease of the transmit power and the SIR of the TPC command is above the reliability threshold (step 206). The SIR of the TPC command may be estimated by multiplying an SIR value of pilot bits in the DPCCH with a power offset of the pilot bits to the DPDCH. If the soft symbol from any of the received TPC commands indicates a decrease of the transmit power and the SIR of the TPC command is above the reliability threshold, the combined TPC command is set to −1 to decrease the transmit power (step 214). Otherwise, the function γ is calculated in accordance with Equation (12) (step 208).

It is then determined whether the function γ is greater than the combining threshold (step 210). If the function γ is not greater than the combining threshold, the combined TPC command is set to −1 to decrease the transmit power (step 214). If the function γ is greater than the combining threshold, the combined TPC command is set to +1 to increase the transmit power (step 212).

Figure 3:
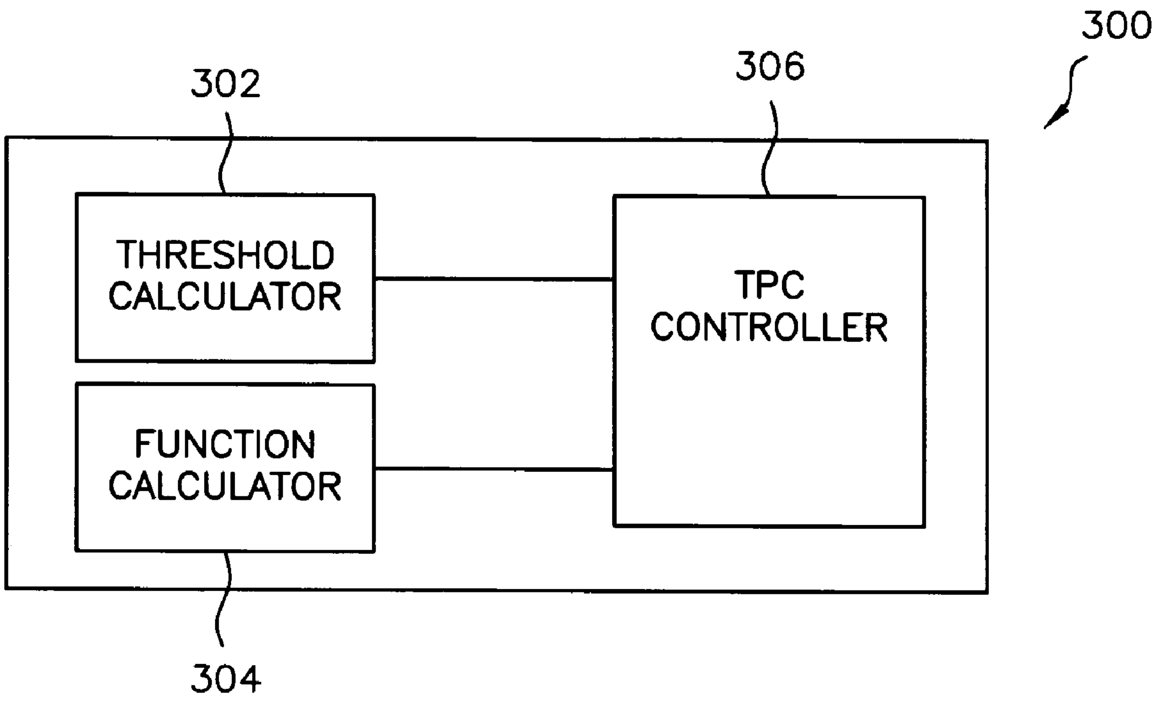
FIG. 3 is a block diagram of an apparatus for deriving a combined TPC command in accordance with the present invention.

FIG. 3 is a block diagram of a WTRU 300 for deriving a combined TPC command in accordance with the present invention. The WTRU 300 comprises a threshold calculator 302, a function calculator 304 and a TPC controller 306. As those of skill in the art would realize, a WTRU would comprise many other RF, power and processing components which are not shown in FIG. 3. Only those components that are relevant to the present invention are shown and described for clarity. The threshold calculator 302 computes and/or sets a reliability threshold and a combining threshold for TPC. The function calculator 304 computes a function γ. The TPC controller 306 generates a combined TPC command from the received two or more TPC commands from a plurality of cells during soft handover. The TPC controller 306 generates the combined TPC command of −1 for a decrease of the transmit power if either: 1) any of the received TPC commands indicates a decrease of the transmit power and the SIR of the TPC command indicating a decrease of the transmit power is greater than the reliability threshold; or 2) if the function γ is not greater than the combining threshold. The TPC controller 306 generates the combined TPC command of +1 for an increase of the transmit power if the function γ is greater than the combining threshold.

Although the features and elements of the present invention are described in the preferred embodiments in particular combinations, each feature or element can be used alone without the other features and elements of the preferred embodiments or in various combinations with or without other features and elements of the present invention.

What is claimed is:

1. In a multi-cell wireless communication system including a wireless transmit/receive unit (WTRU) for which transmit power is controlled by a transmit power control (TPC) command, a method for deriving a combined TPC command from a TPC command received from each of at least two cells of the multi-cell wireless communication system during handover, the method comprising:

computing and setting a reliability threshold and a combining threshold for TPC;

receiving TPC commands from at least two cells of the multi-cell wireless communication system;

determining whether a particular one of the received TPC commands indicates a decrease of the transmit power and that a signal-to-interference ratio (SIR) of the particular TPC command is greater than the reliability threshold; and on a condition that the determination is negative:

computing a function γ based on the particular received TPC command;

comparing the function γ with the combining threshold;

setting the combined TPC command for decrease of the transmit power on a condition that the function γ is less than or equal to the combining threshold; and setting the combined TPC command for increase of the transmit power on a condition that the function γ is greater than the combining threshold.

2. The method of claim 1 wherein the function γ represents a ratio of a probability density function of the combined TPC command for increase of the power to a probability density function of the combined TPC command for decrease of the power for all radio links.

3. The method of claim 1 wherein the SIR of the particular TPC command is computed by multiplying an SIR of pilot bits in a dedicated physical control channel with a power offset of the pilot bits in a dedicated physical data channel.

4. The method of claim 1 wherein the reliability threshold is set to 0.6310.

5. The method of claim 1 wherein the combining threshold is computed by (N−1) ln2, where N is the number of radio links from different radio link sets.

6. The method of claim 1 wherein the function γ is computed by $$\gamma = (2/\sigma_n^2)\sum_{i=1}^{N}\sqrt{E_i}\,W_i = (2/\sigma_n)\sum_{i=1}^{N}\sqrt{\text{SIR\_TPC\_Cell\_i}}\,W_i,$$

where $W_i$ is a TPC command symbol of radio link i, SIR_TPC_Cell_i is an SIR of the TPC command from radio link i, $E_i$ is a signal energy of the TPC command for radio link i and $\sigma_n^2$ is a variance of white noise.

7. The method of claim 6 wherein $\sqrt{E_i}$ is computed by multiplying a magnitude of the pilot bits in a dedicated physical control channel with a magnitude offset of the pilot bits in a dedicated physical data channel.

8. The method of claim 6 wherein $\sigma_n^2$ is computed by averaging noise power of each radio link estimated from dedicated physical control channel pilot bits.

9. In a multi-cell wireless communication system including a wireless transmit/receive unit (WTRU) for which transmit power is controlled by a transmit power control (TPC) command, the WTRU deriving a combined TPC command from a TPC command received from each of at least two cells during handover, the WTRU comprising:

a threshold calculator for computing and setting a reliability threshold and a combining threshold for TPC;

a function calculator for computing a function γ; and a TPC controller for setting a combined TPC command, wherein:

the combined TPC command is set for decrease of the transmit power on a condition that a particular one of the received TPC commands indicates a decrease of transmit power and a signal-to-noise ratio (SIR) of the particular TPC command is greater than the reliability threshold;

the combined TPC command is set for decrease of the transmit power on a condition that none of the received TPC commands indicate a decrease of transmit power, and the function γ is less than or equal to the combining threshold; and the combined TPC command is set for increase of the transmit power on a condition that none of the received TPC commands indicate a decrease of transmit power, and the function γ is greater than the combining threshold.

10. The WTRU of claim 9 wherein the function γ represents a ratio of a probability density function of the combined TPC command for increase of the power to a probability density function of the combined TPC command for decrease of the power for all radio links.

11. The WTRU of claim 9 wherein the SIR of the TPC command is computed by multiplying SIR of pilot bits in a dedicated physical control channel with a power offset of the pilot bits in a dedicated physical data channel.

12. The WTRU of claim 9 wherein the reliability threshold is set to 0.6310.

13. The WTRU of claim 9 wherein the combining threshold is computed by (N−1) ln2, where N is the number of radio links.

14. The WTRU of claim 9 wherein the function γ is computed by $$\gamma = (2/\sigma_n^2)\sum_{i=1}^{N}\sqrt{E_i}\,W_i = (2/\sigma_n)\sum_{i=1}^{N}\sqrt{\mathrm{SIR\_TPC\_Cell\_i}}\,W_i,$$

where $W_i$ is a TPC command symbol of radio link i, SIR_TPC_Cell_i is the SIR of the TPC command from radio link i, $E_i$ is a signal energy of the TPC command for radio link i and $\sigma_n^2$ is a variance of white noise.

15. The WTRU of claim 14 wherein $\sqrt{E_i}$ is computed by multiplying a magnitude of the pilot bits in a Dedicated Physical Control Channel with a magnitude offset of the pilot bits in a Dedicated Physical Data Channel.

16. The WTRU of claim 14 wherein $\sigma_n^2$ is computed by averaging noise power of each radio link estimated from Dedicated Physical Control Channel pilot bits.

17. In a multi-cell wireless communication system including a wireless transmit/receive unit (WTRU) for which transmit power is controlled by a transmit power control (TPC) command, the WTRU including an integrated circuit (IC) for deriving a combined TPC command from a TPC command received from each of at least two cells during handover, the IC comprising:

a threshold calculator for computing and setting a reliability threshold and a combining threshold for TPC;

a function calculator for computing a function γ; and a TPC controller for setting a combined TPC command, wherein:

the combined TPC command is set for decrease of the transmit power on a condition that a particular one of the received TPC commands indicates a decrease of transmit power and a signal-to-noise ratio (SIR) of the particular TPC command is greater than the reliability threshold;

the combined TPC command is set for decrease of the transmit power on a condition that none of the received TPC commands indicate a decrease of transmit power, and the function γ is less than or equal to the combining threshold; and the combined TPC command is set for increase of the transmit power on a condition that none of the received TPC commands indicate a decrease of transmit power, and the function γ is greater than the combining threshold.

18. The IC of claim 17 wherein the function γ represents a ratio of a probability density function of the combined TPC command for increase of the power to a probability density function of the combined TPC command for decrease of the power for all radio links.

19. The IC of claim 17 wherein the SIR of the TPC command is computed by multiplying SIR of pilot bits in a dedicated physical control channel with a power offset of the pilot bits in a dedicated physical data channel.

20. The IC of claim 17 wherein the reliability threshold is set to 0.6310.

21. The IC of claim 17 wherein the combining threshold is computed by (N−1) ln2, where N is the number of radio links.

22. The IC of claim 17 wherein the function γ is computed by $$\gamma = (2/\sigma_n^2)\sum_{i=1}^{N}\sqrt{E_i}\,W_i = (2/\sigma_n)\sum_{i=1}^{N}\sqrt{\mathrm{SIR\_TPC\_Cell\_i}}\,W_i,$$

where $W_i$ is a TPC command symbol of radio link i, SIR_TPC_Cell_i is the SIR of the TPC command from radio link i, $E_i$ is a signal energy of the TPC command for radio link i and $\sigma_n^2$ is a variance of white noise.

23. The IC of claim 22 wherein $\sqrt{E_i}$ is computed by multiplying a magnitude of the pilot bits in a dedicated physical control channel with a magnitude offset of the pilot bits in a dedicated physical data channel.

24. The IC of claim 22 wherein $\sigma_n^2$ computed by averaging noise power of each radio link estimated from dedicated physical control channel pilot bits.

* * * * *

UNITED STATES PATENT AND TRADEMARK OFFICE

CERTIFICATE OF CORRECTION

PATENT NO. : 7,657,278 B2
APPLICATION NO. : 11/234629
DATED : February 2, 2010
INVENTOR(S) : Koo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Thirtieth Day of November, 2010

David J. Kappos
*Director of the United States Patent and Trademark Office*